Nov. 28, 1944.  W. H. GREEN  2,364,023
SEWAGE CLARIFIER
Filed July 24, 1941
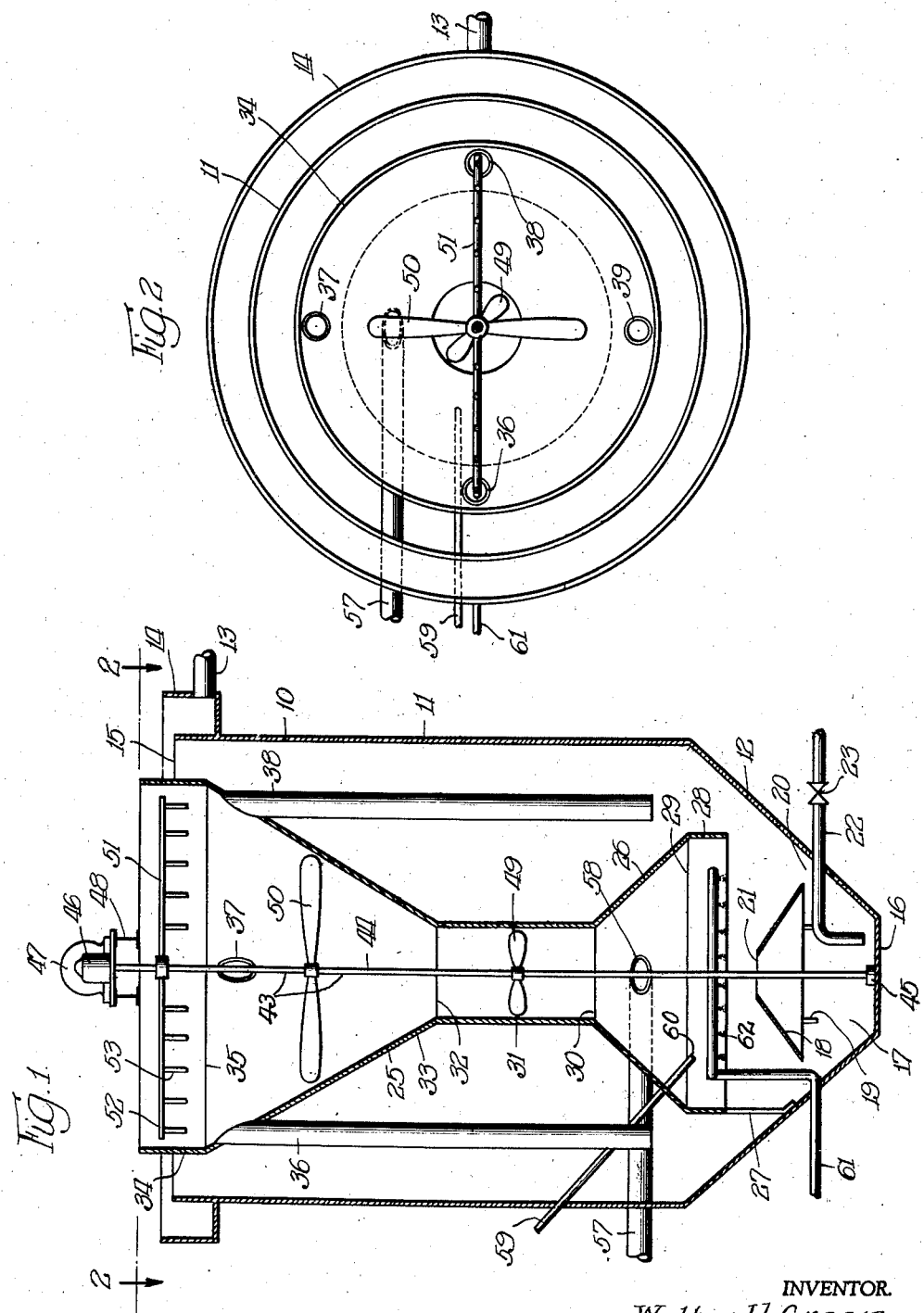
INVENTOR.
Walter H. Green,
BY Patented Nov. 28, 1944

2,364,023

UNITED STATES PATENT OFFICE 2,364,023

SEWAGE CLARIFIER

Walter H. Green, Chicago, Ill., assignor to Infilco Incorporated, a corporation of Delaware Application July 24, 1941, Serial No. 403,861

7 Claims. (Cl. 210—2)

This invention relates to an improved method and apparatus for treating sewage and liquid wastes.

A primary object of the invention is to provide a method and apparatus for raw sewage clarification whereby the time required for clarification is very greatly reduced and improved clarification obtained. At the same time conditions contrary to septic action are maintained throughout the volume of sewage undergoing clarification, thus avoiding objectionable odors and other undesirable conditions arising from long retention of putrescible solids in ordinary sedimentation. Relative to this is the further object of retaining and concentrating the separated solids under contra-septic conditions until a certain point is reached and then quickly removing them from the process and apparatus so that they are not subjected to any prolonged anaerobic action. In modern sewage treatment "clarification" is often thought of as sedimentation, but as used herein the term is not to be so limited.

Another of the objects of this invention is to provide an improved method and apparatus for clarifying raw sewage.

Another object of the invention is to provide an improved method and apparatus for separating sewage solids from sewage.

Another object of the invention is to provide an improved method and apparatus for concentrating sewage sludge.

A still further object of this invention is to provide a method and apparatus for expediting the separation of sludge from sewage.

A still further object of this invention is to provide a novel means for maintaining aerobic conditions in sewage during clarification. It is well known that under the sedimentation of the prior art, which required a long holding time, sewage often became anaerobic and septic in character, especially in the summer, and therefore, much more difficult to clarify, as well as creating objectionable odors.

A still further object of the invention is to provide a method and apparatus for reducing the amount of chemical reagent required for efficiently clarifying sewage.

Another important object of this invention is to provide a method and apparatus for removing from sewage colloidal and dissolved matter. Heretofore, it was possible to remove only the heavier suspended solids, commonly called "settleable solids." By means of my invention I am not only enabled to remove a much larger percentage of the suspended solids but, in addition, to remove a substantial proportion of colloidal and dissolved solids.

A still further object of my invention is to reduce the biological oxygen demand, commonly spoken of as "B. O. D.," of raw sewage beyond a point obtainable by ordinary sedimentation.

Another object of my invention is to provide an apparatus for removing suspended solids, colloidal matter and dissolved material in a relatively small, single structure.

Other objects of the invention will be apparent from the description and claims which follow.

Most present day sewage treatment plants utilize either what is commonly known as the activated sludge process or the trickling filter process, in each of which purification is effected by a biological action. Whichever of these is used, the biological step is preceded by a sedimentation step to effect removal of as great a portion of the suspended solids as may be practical. The greater the removal of such solids the less the load on the biological step, thus decreasing the treatment cost, increasing the throughput flow, enlarging the degree of purification, etc. A long retention time in the sedimentation basin and under quiescent conditions is, in general, favorable to high solids removal, but with putrescible matter present, and particularly so in warm weather, these conditions allow anaerobic conditions to arise, particularly in the lower part of the basin and objectionable septic action to take place. Furthermore, in such sedimentation tanks the sludge is deposited over a large floor area where it is subjected to a further considerable retention period under anaerobic conditions. Consequently, the size of the settling basin must be less than is otherwise desirable, but usually sufficient to provide a liquid displacement time of about one and one-half to two hours based on the average rate of flow over the day and retention of solids for prolonged periods. The usual sedimentation tank removes only settleable solids and provides a reduction of about half only of such solids.

Following the biological treatment step of either of these processes it is customary to again flow the sewage through a second clarifier for sedimenting solids. The second clarifier must be of a size similar to the first as it is still necessary to hold the sewage in a quiescent state for a corresponding period in order to secure a degree of sedimentation which will permit the flow of the effluent into a stream or other place of disposal. The solids which sediment in the clarifiers, commonly called sludge, are usually removed from the clarifier into a digestion tank where they are rendered inert and innocuous.

My invention relates to the clarification of sewage, particularly the incoming raw sewage. In the instant application I am not concerned with grit removal or sludge digestion, but only with the separation of suspended, colloidal and dissolved solids from the sewage.

The methods of separation heretofore known in the art are objectionable in several particulars: (a) The holding of a large body of sewage in a quiescent sedimentation chamber tends to cause development of anaerobic, or septic, conditions therein which interferes with subsequent biological purification. (b) The sedimentation basins must be extremely large as they are usually constructed to provide a holding time of about two hours for the average flow of sewage. Ordinarily, a domestic sewage plant is designed to handle a flow of sewage twice as large as the average daily rate. Such tanks are not only expensive but obviously they provide exceedingly long holding times during the period in which the flow of sewage to be treated is low, thereby tending to give rise to septic conditions. (c) Only a portion, usually about half, of the suspended solids are removed from the sewage. This failure to completely clarify the liquid places a heavy burden on the biological purification and consequently requires large and more expensive treatment facilities, and greater operating costs.

Many modifications have been made in details of the sewage treatment briefly outlined above in order to avoid the difficulties which arise from the character of the impurities present and the consequent great tendency for septic conditions to develop. However, such modifications of the process leave untouched the prolonged holding of the sewage in large sedimentation chambers. My invention approaches the problem from an entirely new angle. The apparatus used by me is much smaller than any heretofore known for like flows, as instead of sedimentation periods of two hours or upwards I can clarify the sewage in a period of a few minutes. Also, by my invention I am able to remove a much greater proportion of the solids in the first clarification step so that the following treatment for purification of the effluent is much less expensive than heretofore known. Finally, I have found that by the use of my apparatus I am able to avoid the development of septic conditions in the sewage during clarification.

Briefly, my invention comprises the concentration of the solids to a considerable degree while retaining them in suspension in sewage undergoing treatment and, during this period, preventing or minimizing to a necessary degree septic conditions that would otherwise arise, by means hereinafter set forth. At the same time, I utilize the solids present to assist in the process, and then quickly separate and remove the solids from the process and apparatus. My invention further comprises apparatus in which and by which conditions necessary and favorable to the process referred to may be established and maintained and the process carried out.

The process of my invention comprises turbulently mixing raw sewage, preferably but not necessarily with an addition of a coagulating reagent, with a major quantity of slurry containing solids separated from previously treated sewage, continuously circulating the mixture in a flow of substantial turbulence and velocity during such treatment, mixing enough air in the circulating sewage to prevent the development of anaerobic conditions therein, withdrawing clarified sewage from the upper portion of the sewage and solids from the lower portion.

It will be evident that, by providing a turbulent mixing and flow of sewage for clarification, my invention is the exact opposite of prior art which relies solely on sedimentation and, therefore, requires the utmost quiescent conditions obtainable. In the preferred embodiment of my invention I provide for stirring the surface of the circulating sewage to break up any scum formation and to increase aeration to avoid the possibility of septic conditions developing during treatment. I have found that by means of my treatment ordinary sewage can be clarified in a period of about thirty minutes or sometimes less, as compared to periods of one and one-half to two hours or more required for clarification by sedimentation. It is evident, therefore, that my apparatus will be much smaller than the usual clarification tank and that even if there should be no aeration of the sewage, there will be less likelihood of septicity than heretofore.

My invention should not be confused with the "activated sludge" type treatment in which clarified sewage liquor is aerated and agitated for a period of ordinarily about four to six hours to permit thorough biological purification of the liquor and the aggregation of microscopic particles by biological means, which "activated sludge" step is preceded and followed by sedimentation to remove solids. My process relates to sewage clarification, and, as above indicated, requires only a few minutes to complete this phase of the treatment. As I am concerned only with clarification, a long period, such as is required in "activated sludge" treatment, is not needed. In effect, my apparatus will be substituted for the "clarifier" of the prior art. My apparatus ordinarily will be followed by the usual trickling filter or the activated sludge aerator. In either event, it will be found that operations of the entire plant will be improved as the sewage liquor undergoing purification contains less pollution load and is much fresher than heretofore.

A preferred embodiment of the apparatus of the present invention is shown in the accompanying drawing which forms a part of this specification, and in which like reference characters in the several figures designate similar elements, and the process itself will be understood from the description and discussion of the apparatus taken with other disclosures thereof herein.

Figure 1 is a vertical cross-sectional view of the preferred embodiment of my invention.

Figure 2 is a plan view of the apparatus shown in Figure 1 taken from the horizontal plane 2—2 of Figure 1.

The apparatus of the present invention includes any suitable tank, such as a cylindrical tank 10, formed by a vertical wall 11, and hopper bottom 12. A clarified sewage effluent 13 is connected to an effluent launder 14 which is located adjacent the top 15 of the tank 10. I prefer that the bottom be formed with a steep slope although a small flat bottom 16 is permissible. This construction prevents undue accumulation of sludge, which would rapidly become septic if prolonged retention of it were permitted. I also prefer to provide a pocket 17 for collection of sludge adjacent the sloping walls 12 of the tank. The pocket 17 can be formed in any suitable manner, but I prefer to use one formed by a conical baffle 18 in spaced relationship from the bottom 12 of the tank by any suitable means, such as brackets or legs 19. The baffle 18 should be so spaced as to permit ready access of solids from the tank, as by means of annular communication 20 and to protect sludge concentrating or accumulating therein from the turbulent conditions in the lower portion of the tank. Means should also be provided, as by an outlet 21, for the upward rise of water from the pocket 17. A sludge outlet 22 leads from the bottom of the pocket 17 and is provided with a valve 23 in order to control the removal of sludge from the apparatus.

Within the tank 10, I place a partition 25 for confining a mixing and circulating zone of a closed fountain type, thus dividing the tank into two vertically extending laterally separated flow passageways. It is also necessary to provide an impeller, or other suitable propelling means, for producing a circulation of considerable volume and velocity through the circulating zone, to maintain the solids contained in the circulating sewage in suspension, and to aid in coagulating colloidal or dissolved matter. Various arrangements of the partition and impeller will be obvious to those skilled in the art, but I have used and prefer an arrangement such as illustrated in the drawing. The preferred arrangement of partition 25 consists of a conical hood 26 in spaced relationship from the hopper bottom 12 of the tank and supported by any suitable means, such as legs 27. A vertical skirt 28 may be attached to the lower rim 29 of the hood. The upper portion of the hood is open, as at 30, and communicates with an intermediate vertical cylinder 31. The vertical cylinder 31, at its upper end 32, communicates with an upwardly expanding or inverted conical chamber 33. The chamber 33 should extend above the liquid level in the apparatus as it is very desirable that the liquid being mixed and circulated through this chamber be prevented from overflowing into the upper portion of the tank 10. Therefore, in those installations in which the size and shape of the tank 10 makes it desirable to do so I may provide a short vertical cylinder 34 at the upper rim 35 of the upwardly expanding chamber 33 in order to raise the chamber above the liquid level of the apparatus without approaching too closely to the upper rim 15 of the tank. I further provide a plurality of vertical draft tubes, such as 37, 37, 38, and 39, leading from adjacent the upper portion of the upwardly expanding chamber 33 down to the lower portion of the tank. Preferably all parts of the partition will be vertical or be steeply sloping, at an angle of not less than 45 degrees from horizontal, to prevent sludge from remaining thereon.

Coaxially aligned within the flow space enclosed by the partition 25, I place a mixing and agitating apparatus 43 which may be of any suitable arrangement. I show a preferred embodiment in the drawing. Briefly, it comprises a shaft 44, the lower end of which is journaled in a bearing 45, located in the bottom of the tank. The upper end of the shaft 44 is attached to reducing gears 46 which in turn are driven by a motor 47. The reducer and motor should be placed above the liquid level in the apparatus and can be supported by any suitable means, such as a bridge 48. Affixed to the shaft 44 are impellers and agitators to provide a turbulent mixing within the partition 25 and a circulation therethrough, and through the down draft tubes 36, 37, 38, and 39 of relatively high velocity. For this purpose I prefer to place an impeller 49, rigidly affixed to the shaft 44, within the intermediate cylinder 31, which provides communication between the hood 26 and the upwardly expanding chamber 33. I also prefer to place a larger impeller 50, also rigidly affixed to the shaft 44, within the upwardly expanding chamber 33. At the liquid level in the apparatus I prefer to have a rake 51 for agitating the surface of the liquid in the upwardly expanding chamber 33. This stirs air into the surface of the sewage undergoing treatment. Some air is absorbed by the circulating sewage and carried into the lower portion of the tank. In this way and also due to the repeated and rapid circulation, aerobic conditions are maintained throughout the volume of sewage. The rake 51 may be of any suitable construction, such as a horizontal bar 52 rigidly affixed to the shaft 44 with a plurality of teeth 53 extending down into the liquid.

A raw sewage influent 57 discharges into the space enclosed by the hood 26, as at 58. A chemical feed line 59, likewise may discharge into the space enclosed by the hood, as at 60. In some installations it may be desirable to provide means, such as air line 61, provided with suitable diffusers, such as nozzles 62, for the forced aeration of sewage in the lower portion of the tank and supplied with compressed air by any suitable means, not shown. I have found in actual operation that in ordinary domestic sewages such aeration is not necessary if turbulent agitation and suitable circulation is maintained as above described. If desired, both the necessary circulation and agitation as well as aeration can be had by blowing in air in this way, and then the other means of agitation described may be omitted.

The operation of the apparatus will readily be understood. Raw sewage is discharged under the hood 26 through the influent line 57 and chemicals, if used, are introduced through the feed line 59. The motor 47 is operated to cause the impellers to rotate at a speed sufficient to provide a volume of flow of sewage through the mixing and circulating space defined by the partition 25 and the connected down draft tubes, several times the through put of sewage. It is important to provide against sedimentation of solids from the circulating slurry and to provide for one complete recirculation of the liquid enclosed in the partition, the draft tubes and the bottom of the tank below the draft tubes desirably at least once in every five minute period. The size and speed of the impeller can be determined from this basis, but ordinarily they should rotate to provide a peripheral speed of four feet per second, or more. The sewage is turbulently mixed with solids separated and retained from previously treated sewage as it flows upwardly through the partition 25. The major portion of the sewage issuing from the lower ends of the downdraft tubes 36, 37, 38 and 39, will pass around and into the hood 26 and upwardly with the raw sewage being introduced. However, an amount of treated sewage equivalent to the input of raw sewage will be displaced from the mouths of the downdraft tubes and will rise upwardly in the tank 10. After an initial period of operation it will be found that the retained solids contained in the circulating sewage have altered in character, being apparently dewatered to a considerable extent, denser, and also aggregated to form some larger masses. Contrary to former teachings as to flocculating sewage, which advocated very mild agitation with low agitator velocities and no recirculation of sewage in the sedimentation tank, I have found high agitator speeds and high and turbulent recirculation flow to be advantageous as developing more suitable solid particles with respect to their clarifying action and ability to separate quickly and easily from water. Thus I preferably use agitator velocities of double or more the customary maximum two feet per second of the prior art. The slurry formed is of such character that as the output quantity of treated sewage passes upwardly from the mouths of the downdraft tubes, the rising water will carry relatively few particles upwardly out of the slurry. The solids will, therefore, remain in suspension in the lower part of the tank as a slurry and the clarified water will quietly flow upwardly to the top 15 of the tank 10 and be withdrawn by the effluent launder 14. Due to quiescent conditions in the protected space under the baffle 18, much of the solids content will deposit from the slurry therein to form a sludge on the floor. The resulting thinner slurry will rise through the open top 21 of the baffle 18 to be replaced by slurry entering through the space 20 around the lower edge of the baffle. In this way there is a continuous mild circulation in the pocket and solids will be deposited in the pocket 17 from which they may be removed either continuously or intermittently through a line 22. Thus there is a very short retention time for solids outside the aerobic or contra septic conditions of the circulation.

From my experiments and experience so far, I have found that the average time of retention of the sewage in the circulation zone should be at least about ten minutes, and fifteen minutes is apparently somewhat better. A longer time of retention, up to half an hour and more is not harmful if contra septic conditions are maintained, but there is no apparent benefit with ordinary domestic sewage beyond about fifteen minutes. As noted before, the rate of circulation desirably is such as to turn over the whole volume in the circulation zone once in about five minutes. This is not a rigid time but too slow and quiescent circulation is unfavorable to the formation of the right sort of slurry for good clarification and also unfavorable for aeration. The time of retention above the lower end of the downdraft tubes is not important in and of itself and will be largely determined by construction conditions or features. The important thing is the vertical rate of rise as determined by the area between the inner structure and the tank wall and the throughput, and the apparatus is preferably constructed to give a normal upflow rate of about two gallons per square foot per minute. Lower rates are not harmful in general and I have used substantially higher rates. It is, therefore, possible to clarify sewage in a period of about twenty to forty minutes in lieu of a period of two hours required for sedimentation.

Experience with the process and apparatus herein defined has illustrated that under ordinary conditions sewage undergoing treatment in my apparatus will not become septic. This I believe to be due to two factors: first, the fact that the period required for clarification is much shorter than the period required for settling in the old style of sedimentation tanks and the prolonged anaerobic storage of sludge therein; and second, rapid circulation of the sewage undergoing treatment maintains aerobic conditions throughout the whole volume of the sewage. I have found that the rake 51 may be omitted without septic conditions arising. I prefer, however, to have the circulation of sewage undergoing treatment extend upwardly so as to reach the air and to provide the rake 51 to mix some air into the sewage undergoing treatment. It is to be understood that the overcoming of septic action by aeration, while advantageous and preferred, is not essential to the success of the process. Antiseptic reagents, such as, for example, chlorine, may be utilized to inhibit undesirable conditions for the time of retention. If lime be used as a coagulating or precipitating reagent an amount may be added to raise the pH value to a point unfavorable to septic growth.

The degree of purification obtained by my process and apparatus compares favorably with other processes, such as chemical treatment with sedimentation. I have found that without any coagulating reagent a solids reduction of fifty percent or more with corresponding B. O. D. reduction is had, this being about the same as with ordinary two hour sedimentation. By the use of coagulating reagents in suitable doses higher reduction can be had and by such means I have obtained suspended solids reduction up to ninety percent or more within the same time period. In fact, higher rates of flow may be used with coagulation and the time period proportionately shortened. I have also found that with my invention the amount of reagent necessary can be materially reduced.

I have found that water and solids separate very readily within a short distance from the draft tubes. Usually there is a sharply defined line of demarcation between the slurry in the bottom of the tank and the clarified sewage above. This "slurry interface," as it is sometimes called, is often so sharp as to require only a small fraction of an inch to pass from clear sewage into dense slurry. I find that better operating conditions are secured if the slurry interface is maintained at the level of the intermediate cylinder 31. Apparently, it is preferable to maintain the interface at a point where the surface area of the annular space around the partition 25 is at a maximum, at which level the upward rise of water is at a minimum.

I have also discovered that good results can be secured by replacing the mechanical agitating and circulating means 43 with a plurality of compressed air jets or nozzles 62 discharging within the hood 26. In this event, the entire circulating and agitating mechanism 43 can be removed and in place thereof a plurality of compressed air jets 62 discharge within the hood 26. These jets provide a thorough and somewhat agitated mixing of raw sewage with the concentrated slurry formed of solids separated from previously treated sewage. The agitation furnished by compressed air may not be as turbulent nor the circulation of the sewage undergoing treatment as rapid as when mechanical agitation is utilized. However, a longer period of treatment may be offset by the fact that the sewage undergoing treatment is more thoroughly aerated during the treatment.

I have also found by experimentation that sewage can readily be clarified in my apparatus without the use of chemicals. Turbulent agitation and rapid circulation of the sewage and slurry are sufficient in and by themselves to provide for the conditioning of sewage solids into dense and compact particles which are sufficiently tough to avoid disintegration during treatment and to form a concentrated slurry from which the rising liquid will escape in a clarified condition in the outer portion of the tank. It is, therefore, entirely feasible with my apparatus to rapidly and efficiently clarify raw sewage without the use of a chemical reagent.

As used herein, the term "sewage" refers to domestic sewage, trade wastes, polluted liquids and other waste liquids. The term "slurry" as used herein refers to a suspension of sewage being treated and a quantity of solids accumulated from previously treated sewage, preferably while in a suspended condition, several times greater than that in, or formed in, an equal quantity of sewage entering to be treated.

Manifestly, many modifications and variations of the invention hereinbefore set forth may be made by persons skilled in the art without departing from the spirit and scope thereof.

I claim:

1. Sewage clarification apparatus comprising a tank, a vertically extending annular partition structure within said tank, said partition structure being spaced above the floor of said tank and enclosing a central mixing chamber, said mixing chamber and the outer annular space in said tank between the wall thereof and said partition being in open communication below said partition structure, conduit means leading from an upper part of the mixing chamber into an intermediate part of the outer annular space, energy delivery means in said mixing chamber, said means being so positioned that the energy delivered thereby will cause vertical motion of liquid in said chamber, a source of energy outside said chamber, means operatively connecting said source of energy to said energy delivery means, inlet means for inflow of raw sewage discharging into said mixing chamber, an outlet for clarified sewage from the upper part of said outer annular space, a second partition structure below the mixing chamber and so positioned relative to a wall of said tank as to form therewith a sheltered subsidence zone below said mixing chamber, said subsidence zone having an inlet and outlet communicating with said mixing chamber, and a waste discharge from said subsidence zone.

2. Sewage clarification apparatus comprising a tank, a vertically extending partition structure in said tank, the lower part of said partition structure being in the form of a frusto-conically shaped hood, said hood being open at its lower end into the bottom portion of the tank, the partition being shaped above said hood to form an upwardly extending chamber, said hood and said chamber together forming a mixing space extending from the lower portion of the tank to above the normal liquid level therein, a conduit opening from the upper part of the mixing space and extending downwardly to a lower level of said tank, a power driven liquid propeller of such size and so positioned in said mixing space as on operation thereof to cause an upward flow through said mixing space of a magnitude of at least about twice that of the normal inflow of unclarified sewage, means for delivering raw sewage into said mixing space, a clarified sewage outlet from the upper portion of the said tank outside of said mixing space, a second partition in said tank below said hood, said second partition being so shaped and so positioned as to form jointly with a wall of said tank a sheltered subsidence zone below said mixing space, an inlet into said sheltered subsidence zone from the lower portion of said mixing space, an outlet from said sheltered subsidence zone into said mixing space, and a waste discharge outlet from said sheltered subsidence zone.

3. Sewage clarification apparatus comprising a tank, a partition structure extending vertically in said tank from a level in the lower portion thereof to above the normal liquid level therein and separating the tank into two laterally adjacent spaces in open communication one with the other under the lower edge of said partition, conduit means having an inlet from the upper portion of the first of said spaces and discharging into the second of said spaces at a level adjacent the lower end thereof, said partition and said conduit being so arranged as to leave a quiescent zone in the upper part of said second space, said first space and said conduit means together with the space below the partition structure forming a mixing and circulating zone through which sewage undergoing treatment is passed in a cyclic path, a raw sewage inlet for delivering incoming sewage into the mixing and circulating zone, a mechanically driven stream projecting impeller within said mixing and circulating zone and so constructed and arranged as to impart turbulent mixing and a rapid flow to liquid in said mixing and circulating zone, an outlet from the top of the quiescent zone, a second partition structure below the mixing and circulating zone so shaped and so positioned relative to a wall of the tank as to form therewith a sheltered subsidence zone and a passage between said mixing and circulating zone and said sheltered subsidence zone for inflow of sewage into said sheltered subsidence zone, a passage for outflow of partially clarified sewage from said sheltered subsidence zone, and a solids discharge from the lower portion of said subsidence zone.

4. A process of clarifying sewage in a tank, which comprises the steps of maintaining in said tank a body of sewage to be clarified, maintaining a pool of slurry containing unsedimented solids separated and accumulated from previously treated sewage and kept suspended in sewage undergoing treatment in the lower portion of said body of sewage, maintaining a continuous and essentially vertical circulation of slurry of considerable volume leading from said pool of slurry through a confined mixing and reaction zone and back into said pool, discharging raw sewage into said circulating slurry, imparting mechanical impelling energy in addition to any energy imparted by the incoming sewage to said circulating slurry to cause mixing of sewage and circulating slurry and to maintain said circulation of slurry, displacing clarified sewage upwardly from the upper surface of said pool of slurry into a clarified sewage space, withdrawing clarified sewage from adjacent the top of said clarified sewage space, continuously passing a portion of the slurry into a quiescent subsidence zone located within said pool of slurry and opening into the mixing and reaction zone, depositing solids from slurry in said quiescent subsidence zone, returning partially clarified sewage from said quiescent subsidence zone to said pool of slurry, and withdrawing deposited solids from the lower portion of said subsidence zone.

5. A sewage clarification process comprising the steps of confining a body of sewage for a period in a treatment zone, accumulating within the lower portion of said body of sewage a suspension of solids separated from previously treated sewage, maintaining a continuous major recirculation embracing substantially all of the suspension, confining said recirculation to and through a cyclic path which extends upwardly from and returns to the lower portion of said zone, maintaining a quiescent zone in an upper portion of said treatment zone, flowing raw sewage into said recirculating suspension and thereby displacing a corresponding amount of suspension therefrom into said quiescent zone, separating and withdrawing clarified sewage from the contents of said quiescent zone and so effecting a further concentration of solids in said suspension, passing a minor flow out of said recirculating suspension slowly into and through still another and quiescent lower portion of said treatment zone and back into said recirculation, depositing solids from the suspension passing through said quiescent portion, and discharging such deposited solids to waste.

6. The process of claim 5 wherein the recirculation is caused by, and the energy required for maintaining said recirculation is supplied by, discharging compressed air into said recirculating suspension.

7. Sewage clarification apparatus comprising a tank, a small partition structure adjacent the bottom of the tank so constructed and arranged in relation to a wall of the tank as to form a sheltered subsidence zone in the lower portion of the tank having an inlet and an outlet communicating with the lower portion of said tank, a large annular partition structure above said small partition and extending vertically in said tank to above the normal liquid level therein, said partition forming a central space and an outer annular space in said tank, conduit means having an inlet from the upper portion of the central space and discharging into the lower part of the outer annular space, a raw sewage inlet for delivering incoming sewage into said central space, means in the said central space for applying to the sewage therein sufficient energy in addition to that in the sewage entering the space to impart turbulent mixing and a rapid vertical flow to sewage inside said space, a clarified sewage outlet from the upper portion of said outer annular space, and a solids discharge from the lower portion of said subsidence zone.

WALTER H. GREEN.